(12) United States Patent
Homchaudhuri et al.

(10) Patent No.: US 10,231,179 B2
(45) Date of Patent: Mar. 12, 2019

(54) ACCESS POINT STANDBY POWER OPTIMIZATION ACROSS AN ARBITRARY NUMBER OF ASSOCIATED CLIENTS

(71) Applicant: QUALCOMM Incorporated, San Diego, CA (US)

(72) Inventors: Sandip Homchaudhuri, San Jose, CA (US); Youhan Kim, San Jose, CA (US); Srinivas Jasti, Fremont, CA (US); Sunghun Choi, Saratoga, CA (US); Vikram Phogat, San Jose, CA (US); Ye Yuan, San Jose, CA (US); Umang Sureshbhai Patel, Santa Clara, CA (US); Lian Chen, San Jose, CA (US); Sumeet Kumar, San Jose, CA (US); James Simon Cho, Mountain View, CA (US); Sreepathy Aida, San Jose, CA (US); Zhanfeng Jia, Belmont, CA (US); Pradeep Kumar Yenganti, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 327 days.

(21) Appl. No.: 15/051,403

(22) Filed: Feb. 23, 2016

(65) Prior Publication Data
US 2017/0041869 A1 Feb. 9, 2017

Related U.S. Application Data

(60) Provisional application No. 62/210,969, filed on Aug. 27, 2015, provisional application No. 62/201,769, filed on Aug. 6, 2015.

(51) Int. Cl.
*H04W 52/02* (2009.01)
*H04B 7/06* (2006.01)
(Continued)

(52) U.S. Cl.
CPC .......... *H04W 52/0206* (2013.01); *H04B 7/00* (2013.01); *H04B 7/0689* (2013.01);
(Continued)

(58) Field of Classification Search
CPC .. H04B 7/0689; H04B 7/0811; H04B 7/0871; H04B 7/00; H04W 4/06; H04W 52/0206;
(Continued)

(56) References Cited

U.S. PATENT DOCUMENTS 8,116,248 B2 2/2012 Liu et al.
8,744,511 B2 6/2014 Jones, IV et al.
(Continued)

OTHER PUBLICATIONS

Gheorghiu R.A., et al., "Infrastructure to Vehicle Communications using Inductive Loops," WSEAS Transactions on Communications, 2014, vol. 13, pp. 596-605.
(Continued)

*Primary Examiner* — Khoa Huynh
(74) *Attorney, Agent, or Firm* — Patterson & Sheridan, L.L.P. Qualcomm

(57) ABSTRACT

Systems and methods for wireless communications are disclosed. More particularly, aspects generally relate to an apparatus for wireless communications. The apparatus generally includes an interface for communicating with a plurality of wireless nodes via a plurality of antennas, and a processing system configured to determine a power state of each of the plurality of wireless nodes, and change from a first antenna mode used for communicating with the wireless nodes using a first number of spatial streams to a second antenna mode used for communicating with the wireless nodes using a second number of spatial streams, based on the determined power states of the wireless nodes.

27 Claims, 5 Drawing Sheets

(51) Int. Cl.
*H04B 7/08* (2006.01)
*H04B 7/00* (2006.01)

(52) U.S. Cl.
CPC ........ *H04B 7/0871* (2013.01); *H04W 52/028* (2013.01); *H04W 52/0258* (2013.01); *Y02D 70/00* (2018.01); *Y02D 70/1224* (2018.01); *Y02D 70/1242* (2018.01); *Y02D 70/1262* (2018.01); *Y02D 70/142* (2018.01); *Y02D 70/23* (2018.01); *Y02D 70/444* (2018.01)

(58) Field of Classification Search
CPC ........... H04W 52/0258; H04W 52/028; H04W 88/06; Y02D 70/00; Y02D 70/1224; Y02D 70/1242; Y02D 70/1262; Y02D 70/142; Y02D 70/23; Y02D 70/444; Y02D 70/446
See application file for complete search history.

(56) References Cited

U.S. PATENT DOCUMENTS

| | | | |
|---|---|---|---|
| 8,792,575 B2 | 7/2014 | Liu et al. | |
| 2003/0153358 A1* | 8/2003 | Moon | H04B 7/0811 455/561 |
| 2011/0199953 A1* | 8/2011 | Seok | H04W 4/06 370/312 |
| 2011/0268037 A1 | 11/2011 | Fujimoto | |
| 2012/0311220 A1* | 12/2012 | Goldenberg | G06F 13/387 710/313 |
| 2013/0017797 A1 | 1/2013 | Ramasamy et al. | |
| 2014/0024323 A1 | 1/2014 | Clevorn et al. | |
| 2014/0092877 A1* | 4/2014 | Kazmi | H04W 88/06 370/336 |
| 2016/0087775 A1* | 3/2016 | Hedayat | H04L 1/12 370/329 |

OTHER PUBLICATIONS

Minh Q.T., et al., "Virtualized Multihop Access Networks for Disaster Recovery," IEEE 14th International Symposium and Workshops on a World of Wireless, Mobile and Multimedia Networks (WoWMoM), 2013, 6 pages.
International Search Report and Written Opinion—PCT/US2016/041194—ISA/EPO—dated Sep. 15, 2016.

* cited by examiner

ACCESS POINT STANDBY POWER OPTIMIZATION ACROSS AN ARBITRARY NUMBER OF ASSOCIATED CLIENTS

CROSS-REFERENCE TO RELATED APPLICATION

This application claims priority to U.S. Provisional Patent Application No. 62/201,769, filed on Aug. 6, 2015 and U.S. Provisional Patent Application No. 62/210,969, filed on Aug. 27, 2015, which are hereby expressly incorporated by reference in its entirety

BACKGROUND

Field of the Disclosure

Certain aspects of the present disclosure generally relate to wireless communications and, more specifically, to software enabled access points (softAP or S-AP) standby power optimization across an arbitrary number of associated clients.

Description of Related Art

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

Generally, a wireless multiple-access communication system can simultaneously support communications for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

One use of a wireless terminal is to send and receive data carried via a packet data network (PDN). Generally, an Access Point Name (APN) is used to identify a PDN for a mobile data user to communicate with. In addition to identifying the PDN, the APN may also be used to define the type of service. Examples of such connection-based services include a connection to a wireless application protocol (WAP) server, multimedia messaging services (MMS), or an internet protocol (IP) multimedia subsystem (IMS) service (e.g., voice over IP (VoIP), video telephony or text messaging) provided by a particular PDN. An APN is used in 3GPP data access networks, e.g. general packet radio service (GPRS), evolved packet core (EPC).

A wireless device may be capable of accessing the Internet over a wireless wide-area network (WWAN) connection and accepting connections over a wireless local area network (WLAN) connection. With these features, the device is capable of connecting to the Internet over the WWAN and sharing the Internet connection with other wireless devices over the WLAN. A wireless device with these capabilities may be referred to as a software enabled access point (softAP). SoftAP wireless devices are often portable devices and as such, battery life is a concern.

Current implementations of softAPs may attempt to save power by duty-cycling (e.g., power shutoff) the softAP. However, duty-cycling may impact AP discoverability or result in packet loss with multiple connected clients.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Aspects of the present disclosure provide an apparatus for wireless communications. The apparatus generally an interface for communicating with a plurality of wireless nodes via a plurality of antennas, and a processing system configured to determine a power state of each of the plurality of wireless nodes, and change from a first antenna mode used for communicating with the wireless nodes using a first number of spatial streams to a second antenna mode used for communicating with the wireless nodes using a second number of spatial streams, based on the determined power states of the wireless nodes.

Aspects of the present disclosure provide a method for power reduction by an access point (AP) capable communicating with a plurality of wireless nodes via a plurality of antennas. The method generally includes determining a power state of each of the plurality of wireless nodes, and changing from a first antenna mode used for communicating with the wireless nodes using a first number of spatial streams to a second antenna mode used for communicating with the wireless nodes using a second number of spatial streams, based on the determined power states of the wireless nodes.

Aspects of the present disclosure provide an apparatus for wireless communications. The apparatus generally includes means for determining a power state of each of the plurality of wireless nodes, and means for changing from a first antenna mode used for communicating with the wireless nodes using a first number of spatial streams to a second antenna mode used for communicating with the wireless nodes using a second number of spatial streams, based on the determined power states of the wireless nodes.

DETAILED DESCRIPTION

Figure 1:
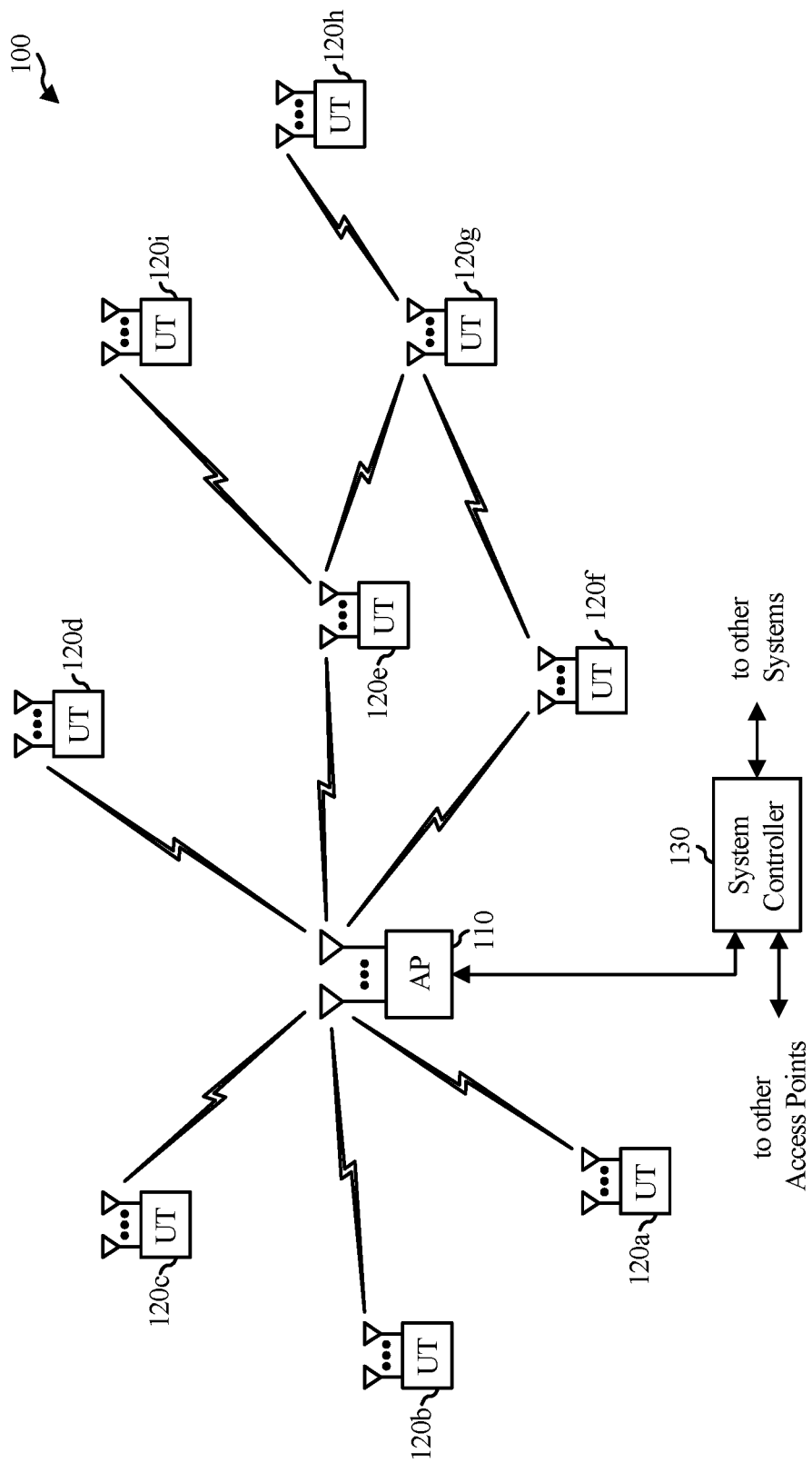
FIG. 1 illustrates a diagram of an example wireless communications network, in accordance with certain aspects of the present disclosure.

Aspects of the present disclosure provide an apparatus for wireless communications. For example, the apparatus may include an interface for communicating with a plurality of wireless nodes via a plurality of antennas and a processing system configured to determine a power state of each of the plurality of wireless nodes, and change from a first antenna mode used for communicating with the wireless nodes using a first number of spatial streams to a second antenna mode used for communicating with the wireless nodes using a second number of spatial streams, based on the determined power states of the wireless nodes. By dynamically entering a low power state based on determined power states of associated wireless nodes, battery life of a softAP may be improved.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may use sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system uses orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may use interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, a Radio Network Controller ("RNC"), an evolved Node B (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), or some other terminology.

An access terminal ("AT") may comprise, be implemented as, or known as a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium.

FIG. 1 illustrates a system 100 in which aspects of the disclosure may be performed. For example, the access point 110 or user terminal 120 may determine whether another access point 110 or user terminal 120 is capable of receiving a paging frame (e.g., an ultra low-power paging frame) via a second radio (e.g., a companion radio), while a first radio (e.g., a primary radio) is in a low-power state. The access point 110 or user terminal 120 may generate and transmit the paging frame comprising a command field (e.g., a message ID field) that indicates one or more actions for the other access point 110 or user terminal 120 to take.

The system 100 may be, for example, a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 may couple to and provide coordination and control for the access point.

A system controller 130 may provide coordination and control for these APs and/or other systems. The APs may be managed by the system controller 130, for example, which may handle adjustments to radio frequency power, channels, authentication, and security. The system controller 130 may communicate with the APs via a backhaul. The APs may also communicate with one another, e.g., directly or indirectly via a wireless or wireline backhaul.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an access point (AP) 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The access point 110 and user terminals 120 employ multiple transmit and multiple receive antennas for data transmission on the downlink and uplink. For downlink MIMO transmissions, $N_{ap}$ antennas of the access point 110 represent the multiple-input (MI) portion of MIMO, while a set of K user terminals represent the multiple-output (MO) portion of MIMO. Conversely, for uplink MIMO transmissions, the set of K user terminals represent the MI portion, while the $N_{ap}$ antennas of the access point 110 represent the MO portion. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also use a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
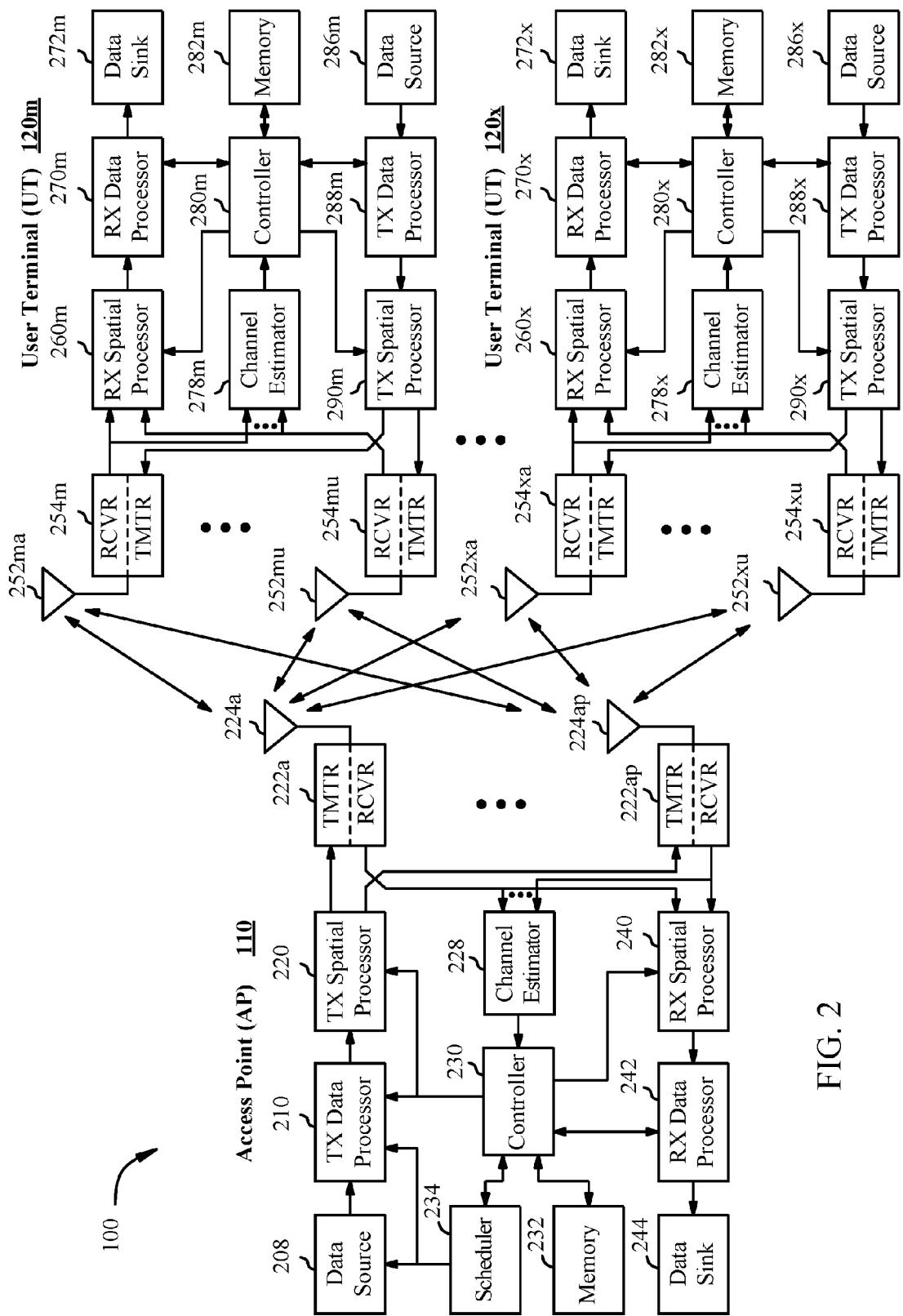
FIG. 2 illustrates a block diagram of an example access point and user terminals, in accordance with certain aspects of the present disclosure.

FIG. 2 illustrates example components of the AP 110 and UT 120 illustrated in FIG. 1, which may be used to implement aspects of the present disclosure. One or more components of the AP 110 and UT 120 may be used to practice aspects of the present disclosure. For example, antenna 224, Tx/Rx 222, processors 210, 220, 240, 242, and/or controller 230 may be used to perform the operations described herein and illustrated with reference to FIGS. 5-5A.

FIG. 2 illustrates a block diagram of access point 110 and two user terminals 120m and 120x in MIMO system 100. The access point 110 is equipped with $N_t$ antennas 224a through 224ap. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink. For SDMA transmissions, $N_{up}$ user terminals simultaneously transmit on the uplink, while $N_{dn}$ user terminals are simultaneously transmit on the downlink by the access point 110. $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a transmit (TX) data processor 288 receives traffic data from a data source 286 and control data from a controller 280. The controller 208 may be coupled with a memory 282. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

Nup user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing. The controller 230 may be coupled with a memory 232

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal. The decoded data for each user terminal may be provided to a data sink 272 for storage and/or a controller 280 for further processing At each user terminal 120, a channel estimator 278 estimates the downlink channel response and provides downlink channel estimates, which may include channel gain estimates, SNR estimates, noise variance and so on. Similarly, at access point 110, a channel estimator 228 estimates the uplink channel response and provides uplink channel estimates. Controller 280 for each user terminal typically derives the spatial filter matrix for the user terminal based on the downlink channel response matrix Hdn,m for that user terminal. Controller 230 derives the spatial filter matrix for the access point based on the effective uplink channel response matrix Hup,eff. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
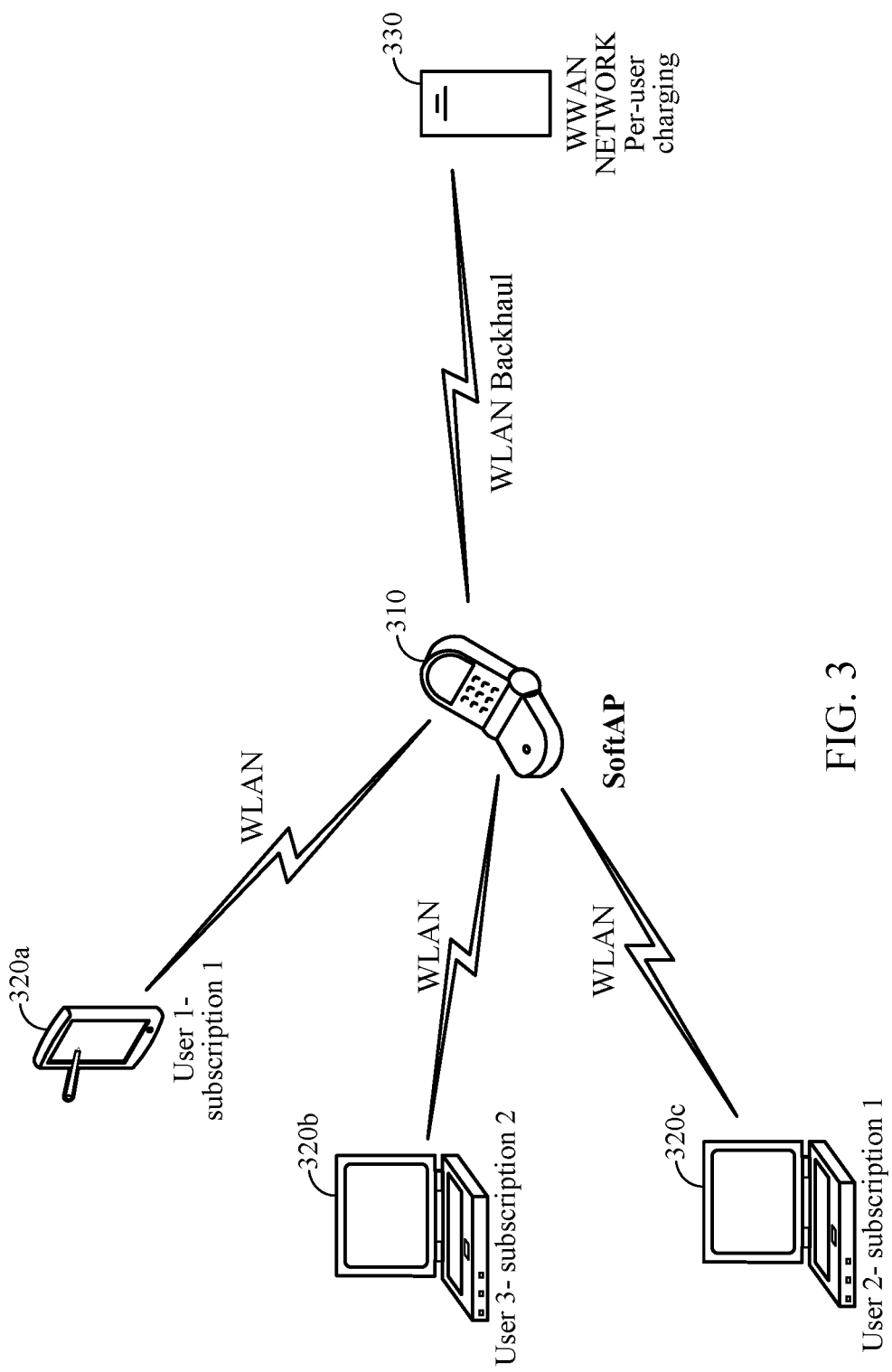
FIG. 3 illustrates an example softAP, in accordance with certain aspects of the present disclosure.

SoftAPs allow the sharing of wireless wide area network (WWAN) backhaul with one or more wireless local area network (WLAN) client stations (STAs). FIG. 3 illustrates an example softAP 310, in accordance with certain aspects of the present disclosure. SoftAP 310 with wireless wide area network (WWAN) and wireless local area network (WLAN) interfaces to may act as a WLAN AP and share a WWAN connection with other WLAN client STAs 320a, 320b, and 320c. SoftAP 310 which may include one or more module of UE 110 of FIG. 2 may perform the functions described herein.

With reference to FIG. 3, a UE operating in a mobileAP mode (mobile Access Point mode) 310 may use wireless technologies such as GSM, UMTS, LTE, and the like for a WLAN backhaul connection. Connection establishment and maintenance as well as connection release responsibilities reside in a modem module of the softAP. The modem module implements the Wide Area Network (WAN) protocols. The mobileAP-capable device may also work as a wireless router where, for example, a WLAN (e.g., 802.11xx) protocol is responsible for router functionality.

A softAP may act as a WLAN (e.g., Wi-Fi) hotspot. As such, one or more Wi-Fi client STAs, such as a laptop, mobile device, and/or tablet may associate with the softAP to access the internet. When all WLAN client devices disassociate from the softAP, a modem module of the softAP may wait for the expiry of a timer prior to tearing down a data connection with the network.

For example, the softAP may wait for a data dormancy timer to expire prior to tearing down the data connection with the network. The data dormancy timer may be 10-30 seconds, depending on the technology. In an effort to save network radio resources, time, and power at the softAP, according to aspects of the present disclosure, the softAP may tear down a data link to the network upon determining the last WLAN client STA has disassociated from the softAP. In this manner, the softAP may not wait for a period of time defined by a data dormancy timer to elapse prior to tearing down a data link connection between the softAP and the network.

SoftAP Standby Power Reduction

A softAP device may be capable of communicating with a core network and one or more WLAN client devices. The softAP may reside on a UE, a dedicated WLAN hotspot, or a consumer peripheral equipment (CPE). The softAP device may be a battery operated device. However, there has been relatively little focus on power conservation for softAP devices. Previous techniques for softAP standby power conservation involved duty-cycling the AP periodically over the course of tens of milliseconds. However, duty cycling, or turning off, an AP can be error prone and can reduce discoverability and increase packet losses as the AP is not discoverable and cannot receive packets when it is turned off.

Figure 4:
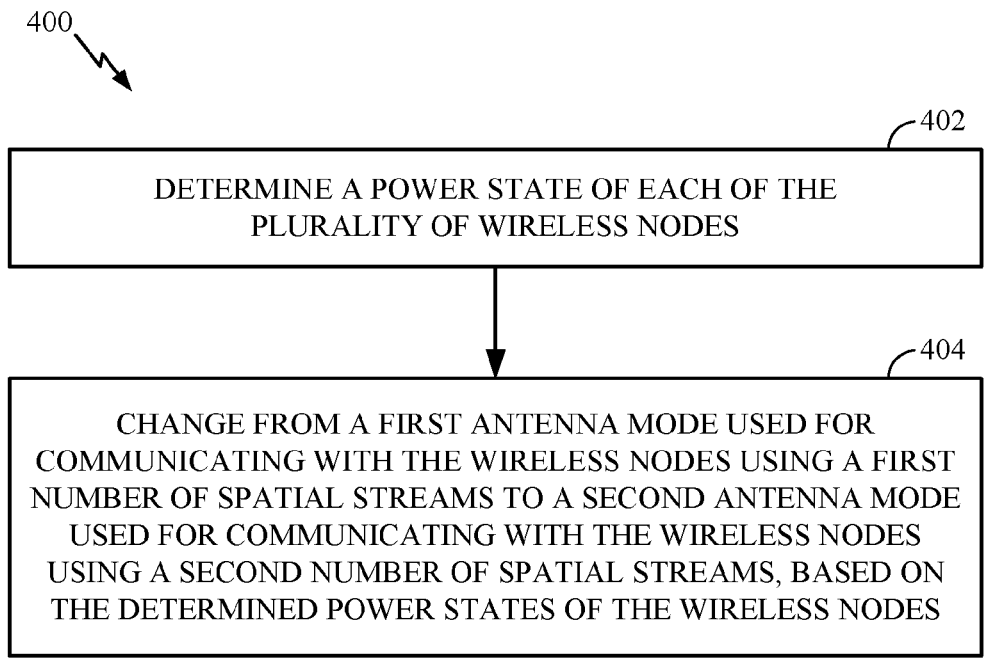
FIG. 4 illustrates a block diagram of example operations for power reduction by an access point, in accordance with certain aspects of the present disclosure.

FIG. 4 illustrates a block diagram of example operations for power reduction by an access point (e.g., a softAP), in accordance with certain aspects of the present disclosure. The operations 400 may be applied to any type of multi-stream UL transmission. The operations 400 may be performed by an apparatus, such as an AP 110 as illustrated in FIGS. 1 and 2, and a softAP 310 as illustrated in FIG. 3. The operations 400 begin at 402 by determining a power state of each of the plurality of wireless nodes. For example, the apparatus may be acting as a soft AP to provide WWAN access to the wireless nodes and may monitor the power state of all associated client STAs.

At 404, the apparatus changes from a first antenna mode used for communicating with the wireless nodes using a first number of spatial streams to a second antenna mode used for communicating with the wireless nodes using a second number of spatial streams, based on the determined power states of the wireless nodes. As will be described in greater detail below, the apparatus may switch between a single stream (1×1) antenna mode when all wireless nodes are in a low power state and quickly switch to a MIMO (e.g., 2×2 or 4×4) antenna mode when one or more of the wireless nodes exit the low power state. As used herein, a low power state generally refers to any state having lower power consumption than another state (e.g., an antenna mode with only single stream transmissions, as in a 1×1 antenna mode, may be considered a low power state relative to a multi-stream antenna mode, such as a 2×2 or 4×4 antenna mode) due to reduced processing power (e.g., processing fewer streams for transmission or fewer samples for reception). As will be described below, the apparatus may switch from the second antenna mode to a different mode (e.g., back to the first antenna mode) if it detects one of the wireless nodes is no longer in a low power state (e.g., by detecting one of the wireless nodes is transmitting at a rate not supported in the second antenna mode).

Power reduction for MIMO softAPs which avoid turning off the AP entirely may be achieved by optimizing the antenna mode and other softAP configurations. For example, in some embodiments, a client STA associated with a softAP may be able to enter into a low (or first) power state, such as power save mode (PSM), unscheduled automatic power save delivery (U-APSD), or wireless multimedia power save (WMM-PS) mode. In some cases, the softAP may monitor the power state of all client STAs associated with the softAP. In some cases, the associated client STAs may individually send a network sleep entry notification indicating that a client STA is entering a client STA low power state. For example, a client STA may send an indication that it is entering (or has entered) a sleep, standby, or antenna mode which reduces the power consumed by the client as compared to a normal operating mode. The softAP may receive this indication of power state from the client STAs and determine whether to enter into a softAP power saving mode. After the softAP has determined that all of the associated client STAs have entered power saving mode, the softAP may wait a set timeout period and after the set timeout period, the softAP may enter its own lower power state.

In this low power state, the softAP may change its antenna mode to a different antenna mode. For example, the softAP may, in a first configuration, operate in a multi-stream, MIMO 2×2 Tx/Rx antenna mode configuration where two antennas are used for transmitting and two antennas are used for receiving transmission. Other configurations may also be supported, including a single stream, 1×1 configuration, as well as other multi-stream configurations, N×M, utilizing multiple transmit and receive antennas. When entering the low power state, the softAP may transition from its previous 2×2 or higher multi-stream antenna configuration and enter into a 1×1 single stream configuration. The softAP, for example, may change the chain mask from the multi-stream 2×2 configuration to a single stream 1×1 configuration. By entering the single stream configuration, a softAP may save approximately 80 mA for 2G softAP standby and approximately 40 mA for 5G softAP standby, independent of the number of associated STAs. Such chain mask changes can be made locally (i.e., inside the softAP) without any frame exchange with the associated STAs or can be made by dedicated frame exchanges with each of the plurality of STAs.

The softAP may continue to send its beacon and respond to probe requests in the 1×1 single stream configuration and standby. A probe request (discovery request) can continue to be received and beacon broadcasts sent in the 1×1 single stream configuration as probe requests and beacon broadcasts are single stream and can be successfully handled by the physical (PHY)/media access control (MAC), and software (SW) layers in the single stream configuration.

The softAP may also configure its physical layer (PHY) to operate in the lowest bandwidth mode that satisfies all of the associated client STA's operation modes. For example, if associated stations 1, 2, and 3 require 40 MHz of bandwidth and station 4 requires 20 MHz, the softAP enters a 40 MHz bandwidth PHY mode while in the low power state. If associated stations 1, 2, and 3 disconnect, then the softAP may enter a 20 MHz bandwidth PHY mode during the low power state. However, if station 5, requiring a higher bandwidth, for example 40 MHz, associates with the softAP, the softAP immediately changes the PHY mode to match the highest required bandwidth mode by the associated stations.

After the softAP enters the low power state with the 1×1 single stream configuration, the softAP may be required to exit the low power state and switch to a multi-stream antenna configuration. Such an exit may occur where the softAP needs to transmit downlink multi-stream data, and where the softAP receives an uplink transmission. In the case where the softAP needs to transmit downlink multi-stream data, the softAP can change its chain mask from 1×1 mode to a 2×2 or higher multi-stream mode prior to the transmitting the actual data as the softAP knows, prior to transmission, that it needs to transmit in multi-stream mode. The softAP may detect one or more transmissions at one or more rates not supported in the low power state. For example, in the case where the softAP receives an uplink multi-stream transmission, the softAP may exit from the single stream mode and enter into a multi-stream mode with minimal interruptions.

Figure 5:
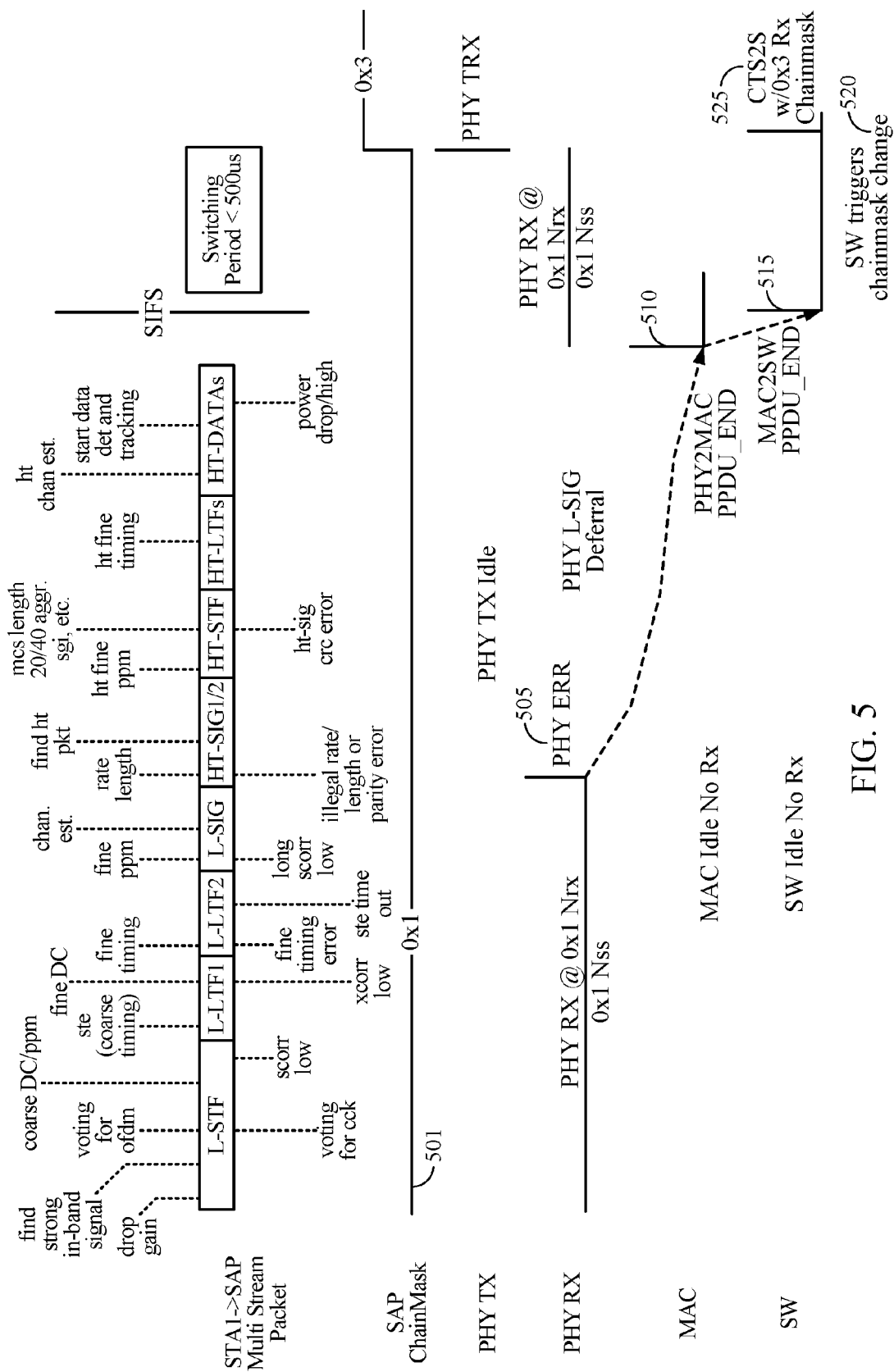
FIG. 5 illustrates an example standby power optimization, in accordance with certain aspects of the present disclosure.

In some implementations, the client STA may indicate to the softAP that it has exited the low-power state by transmitting a multi-stream transmission to the softAP. FIG. 5 illustrates an example standby power optimization, in accordance with certain aspects of the present disclosure. A softAP may be operating in the low power single stream mode, depicted in 501 as a 0×1 mode of the softAP chain mask as the transmitter is idle. Where the softAP receives an uplink multi-stream transmission, the softAP does not necessarily know, prior to reception, that the softAP is receiving an uplink multi-stream transmission. To smoothly exit from the single stream mode, the softAP may detect reception of an uplink multi-stream transmission, for example, by comparing a number of streams indicated in a signal field of a preamble of a packet to a number of streams supported in the lower power state. Additionally, the softAP may programmatically enable a physical layer error (PHY ERR 505) detection mode for all "unsupported rate" packets (e.g., unsupported rates) when entering into the single-stream mode.

Multi-stream packets are modulated using a basic binary phase shift key (BPSK) rate and are essentially single stream transmissions until the data portion starts. The single-stream information is indicated in HT-SIG-A or VHT-SIG-A signal field in the packet preamble. Where the softAP in a low power mode receives a multi-stream packet transmission from a connected client STA, the packet may be decoded by the softAP up to the HT-SIG-A or VHT-SIG-A signal field. Decoding the HT-SIG-A or VHT-SIG-A signal field at the receiver PHY may generate a PHY_ERR 505 "UNSUPPORTED_RATE" when the softAP detects that the received transmission consists of more than a single stream (e.g., comparing a number of streams (Nsts) and a number of receive chains (Nrx) such that Nsts>Nrx). As the PHY error detection mode was enabled entering the single stream mode, the PHY will send the packet to the MAC after a PHY L-SIG deferral period. At 510, the MAC receives the remaining portion of the packet at the end of the PPDU and may then utilize direct memory access (DMA) to write the packet frame to the SW memory locations at 515, marked with the specific PHY ERR 505. At 520, the softAP SW may then immediately respond to the PHY ERR by reconfiguring from the 1×1 single-stream configuration to a N×M multi-stream configuration. For a 2×2 device, this may entail switching from a 0×1 chain mask to a 0×3 chain mask.

With a softAP calibrated against the 0×1 and 0×3 chain mask, this switching is near instantaneous and does not require resetting the radio PHY or MAC. For example, the PHY may be paused, the receiving (RX) chain mask updated (e.g., from 0×1 to 0×3), and then unpausing the PHY. In general, this switching action may take less than 500 μs as opposed to tens of ms for AP duty cycling and there is very little impact on discoverability or opportunity for packet loss. This allows the chain-mask to be rapidly altered so as to minimize packet loss, beyond the one packet causing PHY_ERROR. Pausing of PHY may be performed, for example, by turning off the ADC (Analog-to-Digital Converter) clocks which immediately cuts off all over-the-air received samples to PHY.

In general, the PHY can accommodate the immediate pausing of the Rx operation. However, the MAC may not be able to accommodate a sudden stop. For example, where the MAC is receiving a UL transmission from another client STA, suddenly stopping the PHY may result in unwanted side-effects as the data bits from PHY to MAC stops immediately when the ADC clocks are turned off. To mitigate such issues in some embodiments, the softAP may be configured to trigger the change from the first antenna mode to the second antenna mode by transmitting a clear-to-send to self (CTS2S 525) (e.g., a CTS with a target address of the softAP itself) with a zero or non-zero duration (depending on the amount of time to budget for the transition) over a prioritized interframe spacing (PIFS) queue in response to the PHY_ERR and prior to pausing the PHY. The CTS2S 525 message may be sent by a device to silence neighbor stations for a period of time specified in the CTS2S 525 message. The chain mask may be switched after the transmission of the CTS2S 525 message during the time the channel is silenced.

Where there is a strong overlapping base station (OBSS) presence with multi-stream traffic to and from the OBSS, the softAP may switch in and out of the single stream low power mode more frequently than where there is no OBSS, but as the switching is performed quickly, there is no significant impact to softAP discoverability or packet loss.

For an initial client STA that transmits a multi-stream uplink packet causing the softAP exit from the low power single stream mode, there will be a packet lost due to the PHY_ERR and switching by the softAP. However, as the switching occurs very quickly, the client STA's Rate Adaptation logic should not penalize the client STA's Modulation and Coding Scheme (MCS) before the softAP is fully functioning in the multi-stream configuration. When a CTS2S 525 message is utilized, if a second client STA attempts to send a multi-stream transmission during the chain mask switching prior to the CTS2S 525 message, the second client STA will also experience a single packet loss. However, the switching window is expected to take less than 500 μs and the CTS2S 525 transmission allows the softAP to seize the wireless medium, allowing time for the switching of the chain mask and preventing more packets being sent to the softAP by stations waking up from sleep mode.

In yet another embodiment, the chain switching can be effected by aborting the PHY RX process upon first detection of the PHY_ERR event, prior to pausing the PHY. Such an abort has no deleterious effect on the MAC State Machine as the abort is accompanied by a proper sending of a packet end indicator to MAC for the packet that was being received. The MAC may then accommodate for stop in receiving packet information and allows the Soft-AP to subsequently pause the PHY. Using this scheme precludes the need for sending a CTS to self frame and avoids the silencing impact to the medium while still allowing a very rapid chain-mask alteration with minimal impact to uplink packet reception capabilities.

In certain embodiments, further power reductions may be achieved where a softAP is coupled via a peripheral component interconnect express (PCIe) link to various other host components. Where no client STAs are associated, or all associated client STAs are in a power saving mode, the softAP may place the PCIe link into a power saving L1.2 substate (e.g., a PCIe low power state). The PCIe L1.2 substate allows the high speed circuitry of the PCIe link to be turned off while maintaining a lower speed PCIe link. When multi-stream packets are received by the softAP, the PCIe link may be brought out of L1.2 to L1 or L0 mode as the softAP switches from the single stream configuration to the multi-stream configuration, as discussed above. Single-stream packets may continue to be transferred over the PCIe link. Placing the PCIe into the L1.2 substate during softAP standby may reduce power consumption by approximately 20 mA in certain applications.

In certain embodiments, receiver desensitization may be possible (e.g., with desensitization meaning less processing power is required resulting in lower power consumption). After an authentication process, a client STA may associate with a softAP by registering with the softAP, exchanging capabilities, choosing encryption types, and the like. Where there are no client STAs so associated, no packets are expected beyond MCS0, such as probe requests or control frames, and a certain degree of phase error is tolerable. Phase error up to a rate<MCS3 may be tolerable. In such cases, receiver desensitization may be performed, for example, by bypassing the low-dropout regulator and sourcing the supply from a switching mode power supply (SMPS) with acceptable voltage ripple, or otherwise reducing the sensitivity (e.g., desensitize) of the receiver. Receiver desensitization may reduce power consumption by approximately 10 mA in RX ON power during 100 ms of AP ON time in certain applications.

In certain embodiments, the PHY may notify the MAC of the PHY_ERR immediately rather than after an L-SIG deferral period. The MAC may then take one of two actions. Where the MAC is in client STA mode, the MAC may assert a PHY_NAP signal and enter a power save mode during the L-SIG deferral period allowing most PHY circuitry to be shut off and keeping a simple timer to wake up after the L-SIG deferral period. Where the MAC is in Soft-AP mode, the MAC may update the PPDU_END descriptor and promptly notify the SW. The SW may then take corrective action to affect a chain-mask switch. In some embodiments, the CTS2S for chain switching may be transmitted as soon as clear channel assessment (CCA) goes HIGH and the channel is deemed clear. In other embodiments, the CTS2S for chain switching may be transmitted immediately, ignoring the CCA. The CTS2S may be transmitted immediately as the current packet has suffered a decoding error and there is little or no harm in stopping the process while the associated client STA is still transmitting the packet. The chain-mask change may be triggered before the end of the RX of the first packet that had the decoding error, enabling the chain mask switch to occur with only one packet loss for any arbitrary number of stations associated with the softAP.

In certain embodiments, an AP may use an operating mode notification (OMN) element to notify associated client STAs that the AP is entering a low power state and downsizing the receiving chain mask to a single stream mode. OMM is supported by 802.11ac STAs, but may not be fully implemented by 802.11n stations. The OMN may be a dedicated action frame exchanged between the AP and STA. However, a dedicated transmission to each STA results in significant network overhead and latency and may not scale where a large number of client STAs are connected.

An OMN indicating a switch in softAP power modes may also be included as an information element (IE) in the beacon. However, the beacon is an unacknowledged broadcast and some STAs may not receive the notification. For example, a STA may be in a power save mode and miss the beacon or a STA may implement early beacon termination (EBT) and discard or ignore the beacon after the traffic indication map (TIM) or delivery traffic indication map (DTIM) Information Element (IE). The OMN may also be sent as a broadcast message, following a beacon. However, this also does not guarantee reception as broadcast messages are unacknowledged.

In yet another embodiment, the AP may also set the TIM bit for all STAs. Such a setting would enforce all STAs to wake up and send a PS-POLL which can be viewed as an acknowledgment of the receipt of the beacon. The AP may then send a dedicated OMN IE to each STAs that send a PS-POLL. This increases network overhead as all STAs must contend for the channel and send PS-POLL. For a limited number of connected client STAs, this additional overhead may not be an issue.

Figure 4A:
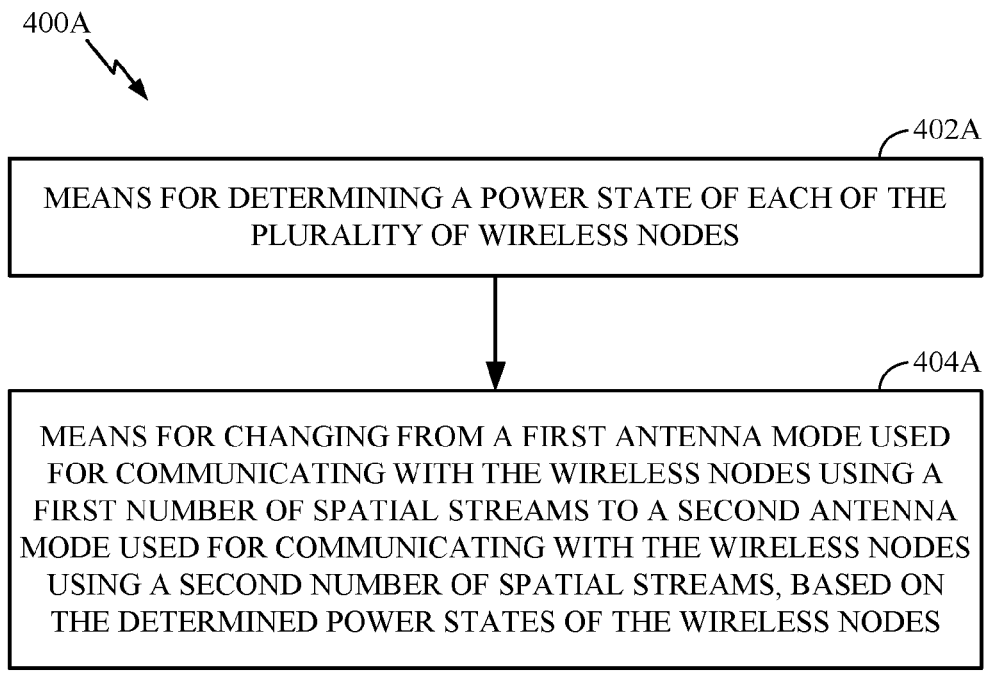
FIG. 4A illustrates example means capable of performing the operations shown in FIG. 4.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operation 400 illustrated in FIG. 4 correspond to means 400A illustrated in FIG. 4A.

In certain embodiments, STAs that receive the OMN may already be in a STA low power state, for example using a scheduled wake-up period. After the STA receives the OMN, the STA may have to wake from the STA low power state, for example, to configure the STA's stream mode, or transmit an acknowledgment to the OMN. Where the AP is configured to enter an AP low power mode only after all associated STAs have entered a STA low power state, the AP may be configured to wait an additional timeout period after receiving OMN acknowledgments. Where the AP is configured to enter the AP low power state after a period of inactivity, the AP may just wait for the configured threshold time and enter the AP low power state.

In certain embodiments, the apparatus may change from a first antenna mode used for communicating with the wireless nodes using a first number of spatial streams to a second antenna mode used for communicating with the wireless nodes using a second number of spatial streams, if a new wireless node attempts to associate with the apparatus.

In certain embodiments, the determined power states of the wireless nodes may be based on the network activity of associated wireless nodes. For example, a softAP may monitor the network activity of all client STAs associated with the softAP. After the softAP has determined that all of the associated client STAs have been inactive for a threshold period of time, the softAP may enter its own lower power state.

In some embodiments, the apparatus may refrain from exiting a low-power state and transmitting a multi-stream transmission when associated wireless nodes may be in a low-power state. Where associated client STAs may be in a low-power state, the associated client STAs may not be able to receive a multi-stream transmission from the softAP. In such cases, the softAP may refrain from exiting from the single stream mode until the client STAs is no longer in the low-power state.

In some implementations, the client STA may send a network sleep exit notification or other indication, for example a PS Poll, (QoS) Null, or (QoS) Data frame, to the softAP indicating that the client STA is exiting the low-power state. The softAP may exit from the single stream mode and enter into a multi-stream mode after receiving the notification or indication.

In certain embodiments, the softAP may exit from the single stream mode and enter into a multi-stream mode after any indication that an associated client STA is not in a low-powered state. For example, where a client STA transmits a notification to or indication, for example a PS Poll, (QoS) Null, or (QoS) Data frame, indicating that the client STA is exiting the low-power state, the softAP may exit from the single stream mode and enter into a multi-stream mode. This minimizes the potential packet loss resulting from transitioning to the multi-stream mode after detecting a multi-stream uplink transmission from the client STA. As another example, the softAP may consider any single stream uplink transmission from any associated client STA as an indication that the client STA has exited its lower-power state and the softAP may exit from the single stream mode. In some implementations, the softAP may determine whether the client STA sending the single stream uplink transmission is capable of multiple stream uplink and exit single stream mode where the client STA is determined to be capable of multiple stream uplink.

Means for determining, detecting, changing, reducing, enabling, changing, switching, and generating may include a processing system, which may include one or more processors, such as the processors 210, 242, and/or the controller 230 of the access point 110 illustrated in FIG. 2 or the processor 304 and/or the DSP 320 portrayed in FIG. 3. Means for outputting (e.g., transmitting) may comprise a transmitter (e.g., the transmitter unit 222) and/or an antenna(s) 224 of the access point 110 illustrated in FIG. 2.

Means for obtaining (e.g., receiving) may comprise a receiver (e.g., the receiver unit 254) and/or an antenna(s) 252 of the AP 110 illustrated in FIG. 2. Means for determining, means for changing, and means for enabling may include a processing system, which may include one or more processors such as processors 260, 270, 288, and 290 and/or the controller 280 of the AP 110.

Means for communicating may include a means for outputting and/or a means for obtaining as described above. In some cases, rather than actually transmitting (e.g., a packet or frame), a device may have an interface to output a packet or frame for transmission (a means for outputting, a means for sending, and a means for notifying). For example, a processor may output a packet or frame, via a bus interface, to a radio frequency (RF) front end for transmission. Similarly, rather than actually receiving a packet or frame, a device may have an interface to obtain a packet or frame received from another device (a means for obtaining). For example, a processor may obtain (or receive) a packet or frame, via a bus interface, from an RF front end for reception.

According to certain aspects, such means may be implemented by processing systems configured to perform the corresponding functions by implementing various algorithms (e.g., in hardware or by executing software instructions) described above.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer readable storage medium with instructions stored thereon separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be used.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
    an interface for communicating with a plurality of wireless nodes via a plurality of antennas; and
    a processing system configured to:
        determine a power state of each of the plurality of wireless nodes
        change from a first antenna mode used for communicating with the wireless nodes using a first number of spatial streams to a second antenna mode used for communicating with the wireless nodes using a second number of spatial streams, based on the determined power states of the wireless nodes;
        enable a physical layer error detection mode upon changing to the second antenna mode, the physical layer error detection mode being capable of detecting one or more transmissions at one or more rates not supported in the second antenna mode; and
        wherein the physical layer error detection mode comprises comparing a number of streams indicated in a signal field of a preamble of a packet to a number of streams supported in the second antenna mode.

2. The apparatus of claim 1, wherein the processing system is further configured to:
    detect one or more transmissions from one or more of the wireless nodes; and
    after the detection, change from the second antenna mode to a different antenna mode.

3. The apparatus of claim 2, wherein the detection comprises detecting one or more transmissions from one or more of the wireless nodes that are not supported in the second antenna mode.

4. The apparatus of claim 2, wherein the different antenna mode comprises the first antenna mode.

5. The apparatus of claim 1, wherein the processing system is further configured to:
    during the physical layer error detection mode, detect an error if the number of streams indicated in the signal field of the preamble of the packet is greater than the number of streams supported in the second antenna mode; and
    change from the second antenna mode to the different antenna mode prior to processing a remaining portion of the packet after the preamble.

6. The apparatus of claim 1, wherein the processing system is further configured to:
    during the physical layer error detection mode, detect an error based on a preamble of a packet; and
    change from the second antenna mode to the different antenna mode prior to processing a portion of the packet after the preamble.

7. The apparatus of claim 1, wherein the second antenna mode comprises a single stream mode if it is determined that each of the plurality of wireless nodes is in a first power state.

8. The apparatus of claim 7, wherein the processing system is further configured to:
generate at least one of a beacon or a response to a probe request in the single stream mode; and
output the at least one of the beacon or the response to the interface for transmission.

9. The apparatus of claim 1, wherein the processing system is further configured to:
detect a multi-stream transmission from one or more of the wireless nodes; and
after the detection, changing from the second antenna mode to a different antenna mode, wherein the different antenna mode comprises a multi-stream mode.

10. The apparatus of claim 1, wherein the processing system is configured to change from the first antenna mode to the second antenna mode by:
sending a clear to send (CTS) transmission with a target address of the apparatus.

11. The apparatus of claim 1, wherein the processing system is further configured to change from the first antenna mode to the second antenna mode in part by switching a power state of a peripheral component interconnect express (PCIe) link of the apparatus.

12. The apparatus of claim 1, wherein the processing system is further configured to:
determine that no wireless nodes are associated with the apparatus; and
after the determination, reduce a sensitivity of one or more receivers of the apparatus.

13. The apparatus of claim 1, wherein the processing system is further configured to notify the wireless nodes of the change from the first antenna mode to the second antenna mode by at least one of:
a beacon notification; or
a notification transmitted in a delivery traffic indication map (DTIM) broadcast transmission.

14. The apparatus of claim 1, wherein the determination comprises:
monitoring for network activity associated with each of the wireless nodes.

15. The apparatus of claim 14, wherein the processing system is further configured to:
determine a particular wireless node is inactive if the monitoring indicates there is no network activity for that particular wireless node during a threshold period of time; and
changing from the first antenna mode to a second antenna mode based in part on the determination that the particular wireless node is inactive.

16. A method for wireless communications, comprising:
determining a power state of each of a plurality of wireless nodes;
changing from a first antenna mode used for communicating with the wireless nodes using a first number of spatial streams to a second antenna mode used for communicating with the wireless nodes using a second number of spatial streams, based on the determined power states of the wireless nodes;
enabling a physical layer error detection mode upon changing to the second antenna mode, the physical layer error detection mode being capable of detecting one or more transmissions at one or more rates not supported in the second antenna mode; and
wherein the physical layer error detection mode comprises comparing a number of streams indicated in a signal field of a preamble of a packet to a number of streams supported in the second antenna mode.

17. The method of claim 16, further comprising:
detecting one or more transmissions from one or more of the wireless nodes; and
after the detection, changing from the second antenna mode to a different antenna mode.

18. The method of claim 17, wherein the detecting comprises detecting one or more transmissions from one or more of the wireless nodes that are not supported in the second antenna mode.

19. The method of claim 16, further comprising:
detecting an error based on a preamble of a packet; and
changing from the second antenna mode to the different antenna mode prior to processing a portion of the packet after the preamble.

20. The method of claim 16, wherein the second antenna mode comprises a single stream mode if it is determined that each of the plurality of wireless nodes is in a first power state.

21. The method of claim 16, further comprising:
detecting a multi-stream transmission from one or more of the wireless nodes; and
after the detecting, changing from the second antenna mode to a different antenna mode, wherein the different antenna mode comprises a multi-stream mode.

22. The method of claim 16, wherein the changing from the first antenna mode to the second antenna mode comprises sending a clear to send (CTS) transmission with a target address of the apparatus.

23. The method of claim 16, wherein the changing from the first antenna mode to the second antenna mode comprises in part switching a power state of a peripheral component interconnect express (PCIe) link.

24. The method of claim 16, further comprising:
determining that no wireless nodes are associated with the apparatus; and
after the determination, reducing a sensitivity of one or more receivers of the apparatus.

25. The method of claim 16, further comprising notifying the wireless nodes of the change from the first antenna mode to the second antenna mode by at least one of:
a beacon notification; or
a notification transmitted in a delivery traffic indication map (DTIM) broadcast transmission.

26. An apparatus for wireless communications comprising:
means for communicating with a plurality of wireless nodes via a plurality of antennas;
means for determining a power state of each of the plurality of wireless nodes;
means for changing from a first antenna mode used for communicating with the wireless nodes using a first number of spatial streams to a second antenna mode used for communicating with the wireless nodes using a second number of spatial streams, based on the determined power states of the wireless nodes;
means for enabling a physical layer error detection mode upon changing to the second antenna mode, the physical layer error detection mode being capable of detecting one or more transmissions at one or more rates not supported in the second antenna mode; and
wherein the physical layer error detection mode comprises comparing a number of streams indicated in a signal field of a preamble of a packet to a number of streams supported in the second antenna mode.

27. A non-transitory computer readable medium, comprising:
- instructions that, when executed by at least one processor, configure the at least one processor to:
- determine a power state of each of the plurality of wireless nodes;
- change from a first antenna mode used for communicating with the wireless nodes using a first number of spatial streams to a second antenna mode used for communicating with the wireless nodes using a second number of spatial streams, based on the determined power states of the wireless nodes;
- enable a physical layer error detection mode upon changing to the second antenna mode, the physical layer error detection mode being capable of detecting one or more transmissions at one or more rates not supported in the second antenna mode; and
- wherein the physical layer error detection mode comprises comparing a number of streams indicated in a signal field of a preamble of a packet to a number of streams supported in the second antenna mode.

* * * * *